United States Patent
Watanabe et al.

(10) Patent No.: US 10,234,805 B2
(45) Date of Patent: Mar. 19, 2019

(54) IMAGE FORMING APPARATUS AND ULTRASONIC SENSOR

(71) Applicant: CANON KABUSHIKI KAISHA, Tokyo (JP)

(72) Inventors: Shuhei Watanabe, Yokohama (JP); Tsutomu Ishida, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/890,855

(22) Filed: Feb. 7, 2018

(65) Prior Publication Data

US 2018/0181045 A1 Jun. 28, 2018

Related U.S. Application Data (63) Continuation of application No. 15/208,055, filed on Jul. 12, 2016, now Pat. No. 9,921,532.

(30) Foreign Application Priority Data

Jul. 13, 2015 (JP) .................. 2015-140086

(51) Int. Cl.
*G01H 17/00* (2006.01)
*G03G 15/00* (2006.01)

(52) U.S. Cl.
CPC ......... *G03G 15/5029* (2013.01); *G01H 17/00* (2013.01); *G03G 2215/00637* (2013.01);
(Continued)

(58) Field of Classification Search
CPC ........... G03G 15/5029; G03G 15/6594; G03G 2215/00738; G03G 2215/00742;
(Continued)

(56) References Cited

U.S. PATENT DOCUMENTS

2009/0230617 A1 9/2009 Segawa
2009/0310992 A1* 12/2009 Iwasa ................. G03G 15/5029
399/45

(Continued)

FOREIGN PATENT DOCUMENTS

CN 101604131 A 12/2009
JP 2007024837 A * 2/2007
(Continued)

*Primary Examiner* — Carla J Therrien
(74) *Attorney, Agent, or Firm* — Canon U.S.A., Inc. I.P. Division (57) ABSTRACT

An image forming apparatus includes an image forming unit, a transmission unit, a reception unit, a control unit configured to obtain a time period until the reception unit receives a first ultrasonic wave via a first recording material and an amplitude value thereof at a reference temperature, obtain a time period until the reception unit receives a second ultrasonic wave via a second recording material and an amplitude value thereof at a different temperature, control an image formation condition for forming the image on the first recording material on the basis of the amplitude value of the first ultrasonic wave, obtain a difference time period between reception of the first and second ultrasonic waves, and control an image formation condition for forming the image on the second recording material on the basis of the difference time period and the amplitude value of the second ultrasonic wave.

7 Claims, 10 Drawing Sheets

(52) U.S. Cl.
CPC ............ *G03G 2215/00742* (2013.01); *G03G 2215/00751* (2013.01)

(58) Field of Classification Search
CPC . G03G 2215/00637; G01N 2291/0237; G01N 2223/642; G01N 29/07; G01N 29/326; G01B 17/02; G01H 17/00
See application file for complete search history.

(56) References Cited

U.S. PATENT DOCUMENTS

| | | | | |
|---|---|---|---|---|
| 2011/0142459 | A1* | 6/2011 | Aoki | G03G 15/6558 399/12 |
| 2013/0039672 | A1* | 2/2013 | Ishida | G03G 15/5029 399/45 |
| 2013/0051818 | A1* | 2/2013 | Mori | G01N 29/348 399/16 |
| 2014/0027971 | A1* | 1/2014 | Fukusaka | B65H 3/46 271/10.01 |
| 2015/0160598 | A1* | 6/2015 | Yagi | G03G 15/5029 399/45 |
| 2015/0177663 | A1* | 6/2015 | Namiki | G01N 29/27 399/45 |
| 2015/0309459 | A1* | 10/2015 | Watanabe | G03G 15/5029 399/45 |
| 2017/0017181 | A1* | 1/2017 | Watanabe | G01H 17/00 |

FOREIGN PATENT DOCUMENTS

| | | | | |
|---|---|---|---|---|
| JP | 2013056771 | A | * 3/2013 | ......... G03G 15/5029 |
| JP | 2013217926 | A | * 10/2013 | |
| JP | 2015125121 | A | * 7/2015 | |

\* cited by examiner

IMAGE FORMING APPARATUS AND ULTRASONIC SENSOR

CROSS-REFERENCE TO RELATED APPLICATIONS

This application is a continuation, and claims the benefit, of U.S. patent application Ser. No. 15/208,055, presently pending and filed on Jul. 12, 2016, and claims the benefit of, and priority to, Japanese Patent Application No. 2015-140086, filed Jul. 13, 2015, which is hereby incorporated by reference herein in its entirety.

BACKGROUND OF THE INVENTION

Field of the Invention

The present invention relates to a technology for controlling an image formation condition when an image is formed on a recording material on the basis of a detection result of the recording material detected by using an ultrasonic wave.

Description of the Related Art

Up to now, some image forming apparatuses such as a copier and a printer are provided with an internal sensor configured to determine a type of a recording material. In these apparatuses, the type of the recording material is automatically determined, and a transfer condition (for example, a transfer voltage or a conveyance speed of the recording material at the time of the transfer) and a fixing condition (for example, a fixing temperature or a conveyance speed of the recording material at the time of the fixing) are controlled in accordance with a determination result.

Japanese Patent Laid-Open No. 2013-056771 describes an image forming apparatus provided with an ultrasonic sensor configured to determine a basis weight of a recording material by irradiating the recording material with an ultrasonic wave and receiving an ultrasonic wave attenuated via the recording material. In this image forming apparatus, image formation conditions such as the transfer condition and the fixing condition are controlled in accordance with the basis weight of the recording material determined by the sensor.

In the above-described sensor that uses the ultrasonic wave, the determination result may vary in some cases depending on a surrounding environment (for example, an atmospheric pressure or a temperature) where the sensor is installed. Thus, according to Japanese Patent Laid-Open No. 2013-056771, an environmental correction is performed on the basis of an amplitude value of the ultrasonic wave obtained in a state in which no recording material exists between a transmission unit and a reception unit. In more details, the correction is performed on the reception result of the ultrasonic wave which is received via the recording material on the basis of a ratio of an amplitude value of the ultrasonic wave obtained in advance in a known environment to an amplitude value of the ultrasonic wave obtained in an environment at the time of the determination of the basis weight. With the above-described control, an influence on the determination result caused by the change in the surrounding environment is suppressed.

However, the surrounding environment of the ultrasonic sensor also changes in the middle of continuously forming an image on a plurality of recording materials. When a temperature around the sensor rises, the amplitude value of the received ultrasonic wave changes, and the basis weight of the recording material may be erroneously determined in some cases. As a result, an erroneous image formation condition may be set, and an image quality may be degraded in some cases.

SUMMARY OF THE INVENTION

The present invention is aimed at providing an image forming apparatus that accurately controls an image formation condition and improves an image quality irrespective of a change in a surrounding temperature even in a case where an image is continuously formed on a plurality of recording materials.

To address the above-described issue, an image forming apparatus according to an aspect of the present invention includes: an image forming unit configured to form an image on a recording material; a transmission unit configured to transmit an ultrasonic wave; a reception unit configured to receive the ultrasonic wave transmitted from the transmission unit; and a control unit configured to obtain a time period since the transmission unit transmits the ultrasonic wave until the reception unit receives a first ultrasonic wave via a first recording material and an amplitude value of the first ultrasonic wave at a reference temperature, and obtain a time period since the transmission unit transmits the ultrasonic wave until the reception unit receives a second ultrasonic wave via a second recording material that is different from the first recording material and an amplitude value of the second ultrasonic wave at a temperature that is different from the reference temperature, in which the control unit controls an image formation condition in a case where the image forming unit forms the image on the first recording material on the basis of the amplitude value of the first ultrasonic wave, obtains a difference time period between the time period until the first ultrasonic wave is received and the time period until the second ultrasonic wave is received, and controls an image formation condition in a case where the image forming unit forms the image on the second recording material on the basis of the difference time period and the amplitude value of the second ultrasonic wave.

In addition, to address the above-described issue, an image forming apparatus according to another aspect of the present invention includes: an image forming unit configured to form an image on a recording material; a transmission unit configured to transmit an ultrasonic wave; a reception unit configured to receive the ultrasonic wave transmitted from the transmission unit; and a control unit configured to control, on the basis of a time period since the transmission unit transmits the ultrasonic wave until the reception unit receives an ultrasonic wave via a predetermined recording material and an amplitude value of the ultrasonic wave received via the predetermined recording material, an image formation condition in a case where the image forming unit forms the image on the predetermined recording material.

Further features of the present invention will become apparent from the following description of exemplary embodiments with reference to the attached drawings.

DESCRIPTION OF THE EMBODIMENTS

Figure 1:
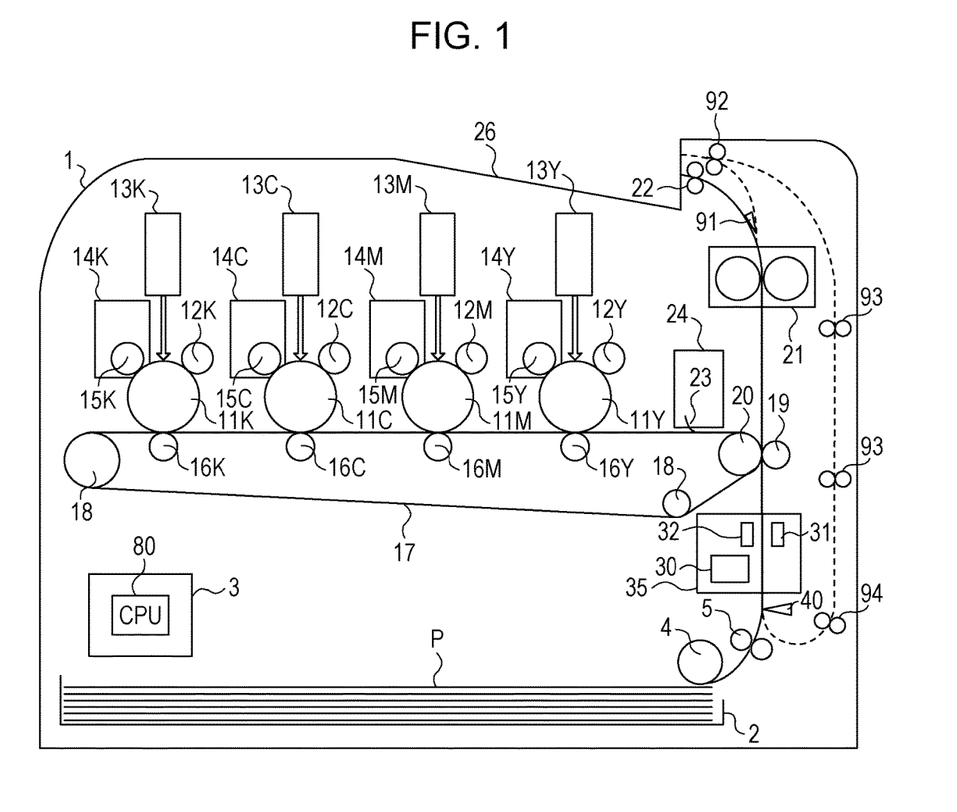
FIG. 1 is a configuration diagram of a color image forming apparatus based on a tandem system according to an exemplary embodiment of the present invention.

Hereinafter, exemplary embodiments of the present invention will be described with reference to the drawings. It should be noted that the following exemplary embodiments are examples and are not intended to limit the scope of this invention to only those exemplary embodiments.
First Exemplary Embodiment An ultrasonic sensor according to the present exemplary embodiment can be used, for example, in an image forming apparatus such as a copier or a printer. FIG. 1 is a configuration diagram illustrating, as an example thereof, an image forming apparatus based on a tandem system (four-drum system) that adopts an intermediate transfer belt, as the image forming apparatus to which the ultrasonic sensor is mounted.

An image forming apparatus 1 in FIG. 1 includes the following components. A container cassette 2 contains recording materials P. The recording material P includes, for example, recording paper (thin paper, plain paper, or thick paper), an OHP sheet, or the like on which an image is formed by the image forming apparatus 1. According to the present exemplary embodiment, the recording paper is used. An image formation control unit 3 controls an operation of an image forming unit of the image forming apparatus 1. A supply roller 4 supplies the recording material P from the container cassette 2. A conveyance roller (conveyance unit) 5 conveys the recording material P supplied by the supply roller 4. Photosensitive drums 11Y, 11M, 11C, and 11K are individual photosensitive drums on which developing agents (toner) of yellow, magenta, cyan, and black are borne, respectively. Charging rollers 12Y, 12M, 12C, and 12K function as primary charging units for the respective colors which uniformly charge the drums 11Y, 11M, 11C, and 11K at a predetermined potential. Optical units 13Y, 13M, 13C, and 13K irradiate the drums 11Y, 11M, 11C, and 11K charged by the primary charging units with laser light corresponding to image data of the respective colors to form electrostatic latent images. Development units 14Y, 14M, 14C, and 14K visualize the electrostatic latent images formed on the drums 11Y, 11M, 11C, and 11K. Developing agent conveyance rollers 15Y, 15M, 15C, and 15K supply the developing agent in the development units 14Y, 14M, 14C, and 14K to sections facing the drums 11Y, 11M, 11C, and 11K. Primary transfer rollers (transfer units) 16Y, 16M, 16C, and 16K for the respective colors primarily transfer the images formed on the drums 11Y, 11M, 11C, and 11K. A belt 17 (intermediate transfer belt) bears the primarily transferred images. A driving roller 18 drives the belt 17. A secondary transfer roller (transfer unit) 19 transfers the images formed on the belt 17 to the conveyed recording material P, and a secondary transfer facing roller 20 faces the secondary transfer roller 19. A fixing unit 21 conveys the recording material P and fixes the transferred images onto the recording material P during the conveyance. A discharge roller 22 discharges the recording material P on which the fixing is performed by the fixing unit 21 to the outside of the image forming apparatus 1. The image forming apparatus 1 also includes a flapper 91, a reversing roller 92, and duplex conveyance rollers 93 and 94. An ultrasonic sensor 35 includes a transmission unit 31 that transmits an ultrasonic wave and a reception unit 32 that receives the ultrasonic wave.

Next, an image forming operation of the image forming apparatus 1 will be described. A CPU 80 is mounted to the image formation control unit 3, and the image formation control unit 3 collectively controls the image forming operation of the image forming apparatus 1. An image forming command or image data is input from a host computer or the like that is not illustrated in the drawing to the image formation control unit 3. In response to the input, the image forming apparatus 1 starts the image forming operation, and the recording material P is supplied from the container cassette 2 by the supply roller 4. The recording material P supplied from the container cassette 2 by the supply roller 4 is conveyed by the conveyance roller 5 and detected by a registration sensor 40. The recording material P detected by the registration sensor 40 is conveyed towards a transfer nip portion composed of the secondary transfer roller 19 and the secondary transfer facing roller 20 by the conveyance roller 5 to match a timing with the image formed on the belt 17.

The drums 11Y, 11M, 11C, and 11K are charged at a certain potential by the charging rollers 12Y, 12M, 12C, and 12K along with the operation in which the recording material P is supplied from the container cassette 2. Subsequently, the optical units 13Y, 13M, 13C, and 13K expose surfaces of the charged photosensitive drums 11Y, 11M, 11C, and 11K with laser beams in response to the input image data to form the electrostatic latent images. To visualize the formed electrostatic latent images, development is performed by the development units 14Y, 14M, 14C, and 14K and the developing agent conveyance rollers 15Y, 15M, 15C, and 15K. The electrostatic latent images formed on the surfaces of the drums 11Y, 11M, 11C, and 11K are developed into the respective colors by the development units 14Y, 14M, 14C, and 14K. Each of the drums 11Y, 11M, 11C, and 11K contacts the belt 17 and rotates in synchronization with the rotation of the belt 17. The developed images of the respective colors are transferred onto the belt 17 in order by the primary transfer rollers 16Y, 16M, 16C, and 16K. Subsequently, the images formed on the belt 17 are secondarily transferred onto the recording material P by the secondary transfer roller 19 and the secondary transfer facing roller 20. The images transferred onto the recording material P are fixed through application of heat and pressure by the fixing unit 21 constituted by a fixing roller or the like. The developing agent remaining on the belt 17 without being transferred to the recording material P is cleaned by a cleaning blade 23, and the cleaned developing agent is accumulated inside a cleaning unit 24.

In a case where the image formation is not performed on a back surface of the recording material P, the recording material P on which the image is fixed is guided by the flapper 91 to a conveyance path where the discharge roller 22 is arranged and discharged to a discharge tray 26. This conveyance path is indicated by a solid line in FIG. 1. On the other hand, in a case where the image formation is also performed on the back surface of the recording material P, the recording material P is guided by the flapper 91 to a conveyance path where the reversing roller 92 is arranged. This conveyance path is indicated by a dotted line in FIG. 1. The reversing roller 92 conveys the recording material P in a direction to be discharged to the outside of the image forming apparatus 1 and reversely rotated at a timing when a predetermined time elapses since a trailing edge (edge on an upstream side in a conveyance direction of the recording material P) of the recording material P passes through the flapper 91. Subsequently, the reversing roller 92 conveys the recording material P to the duplex conveyance roller 93. The duplex conveyance roller 93 conveys the recording material P to the duplex conveyance roller 94, and the recording material P temporarily stops in a state of being nipped by the duplex conveyance roller 94. Thereafter, the recording material P is conveyed to the transfer nip portion at a predetermined timing, and the image formation is performed similarly as on a front surface. When the images are continuously formed on both surfaces of the recording material, the supply of the recording material by the supply roller 4 and the conveyance of the recording material by the duplex conveyance roller 94 are alternately performed.

Next, the ultrasonic sensor 35 will be described. The ultrasonic sensor 35 according to the present exemplary embodiment can determine a basis weight of the recording material P. The basis weight mentioned herein is a mass per unit area of the recording material P, and the unit is represented as $[g/m^2]$. In the image forming apparatus 1 illustrated in FIG. 1, the ultrasonic sensor 35 is arranged upstream of the secondary transfer roller 19 and the secondary transfer facing roller 20 in the conveyance direction of the recording material P. The ultrasonic sensor 35 includes the transmission unit 31 and the reception unit 32, and the transmission unit 31 and the reception unit 32 are arranged so as to sandwich the conveyance path for conveying the recording material P. The ultrasonic sensor 35 further includes an ultrasonic sensor control unit 30 (hereinafter, will be referred to as a sensor control unit 30) configured to instruct transmission and reception of the ultrasonic wave and determine the basis weight of the recording material P.

The CPU 80 performs control on various image formation conditions in accordance with the basis weight of the recording material P which is determined by the sensor control unit 30. The image formation conditions mentioned herein include, for example, a conveyance speed of the recording material P, voltage values applied to the primary transfer roller 16 and the secondary transfer roller 19, a temperature when the fixing unit 21 fixes the image on the recording material P, and the like. The CPU 80 may also control, as the image formation condition, rotation speeds of the primary transfer roller 16 and the secondary transfer roller 19 when the image is transferred. Furthermore, the CPU 80 may control as the image formation condition a rotation speed of the fixing roller provided to the fixing unit 21 when the image is fixed.

Figure 2:
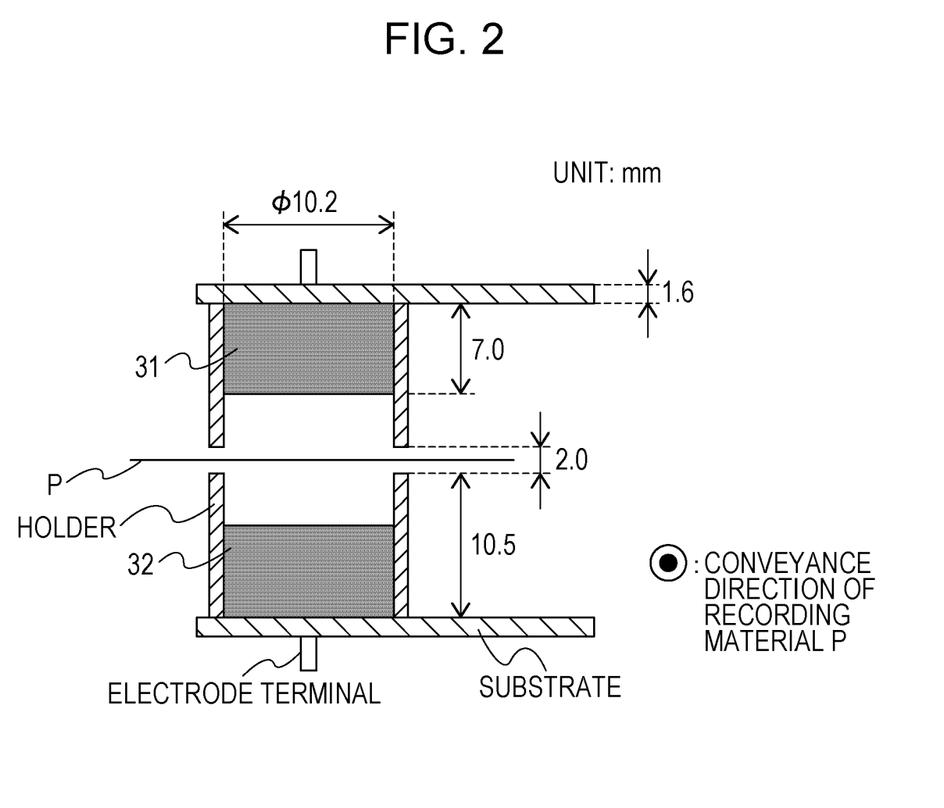
FIG. 2 is a configuration diagram of an ultrasonic sensor according to the exemplary embodiment of the present invention.

FIG. 2 is a configuration diagram of the ultrasonic sensor according to the present exemplary embodiment. The transmission unit 31 and the reception unit 32 are of a tubular type and arranged so as to face each other. A configuration is adopted in which the recording material P is conveyed between the transmission unit 31 and the reception unit 32. The transmission unit 31 and the reception unit 32 are constituted by a member having a diameter of 10.2 [mm] and a height of 7.0 [mm] and are mounted to a substrate having a thickness of 1.6 [mm]. A height of a holder that holds the transmission unit 31 and the reception unit 32 is 10.5 [mm], and a width of a space through which the recording material P is conveyed is 2.0 [mm]. The recording material P is conveyed in a direction perpendicular to the plane of FIG. 2.

The transmission unit 31 and the reception unit 32 have similar configurations and are constituted by a piezoelectric element functioning as an interconversion element of a mechanical displacement and an electric signal and an electrode terminal. In the transmission unit 31, when a pulse voltage at a predetermined frequency is input to the electrode terminal, the piezoelectric element oscillates to generate an acoustic wave. In a case where the recording material P exists along the path, the generated acoustic wave is transmitted through the air to reach the recording material P. When the acoustic wave reaches the recording material P, the recording material P is oscillated by the acoustic wave. The acoustic wave is transmitted while the recording material P is oscillated, and furthermore, the acoustic wave is transmitted through the air to reach the reception unit 32. In this manner, the acoustic wave transmitted from the transmission unit 31 attenuates via the recording material P and reaches the reception unit 32. The piezoelectric element of the reception unit 32 outputs a voltage value in accordance with the amplitude of the received acoustic wave to the electrode terminal. This is the principle of the operation in a case where the ultrasonic wave is transmitted and received by using the piezoelectric elements.

Next, a method for determining the basis weight of the recording material P by using the ultrasonic sensor 35 will be described with reference to a block diagram of FIG. 3A. According to the present exemplary embodiment, the transmission unit 31 and the reception unit 32 transmit and receive the ultrasonic wave at a frequency of 40 kHz. The frequency of the ultrasonic wave is set in advance, and a frequency in an appropriate range may be selected in accordance with the configurations of the transmission unit 31 and the reception unit 32, a detection accuracy, and the like. The sensor control unit 30 includes a transmission control unit 33 having a function of generating a driving signal for transmitting the ultrasonic wave and amplifying the driving signal and a reception control unit 34 having a function of detecting the ultrasonic wave received by the reception unit 32 as a voltage value and processing the signal. Furthermore, the sensor control unit 30 includes a control unit 60 configured to perform controls on the respective units and determine the basis weight of the recording material P.

Figure 4A:
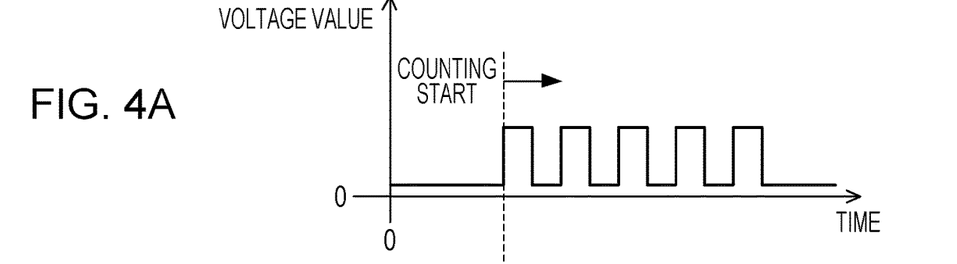
FIGS. 4A to 4C illustrate examples of a driving signal and a reception waveform of the ultrasonic sensor according to the exemplary embodiment of the present invention.

A signal indicating measurement start is input from the control unit 60 to a driving signal control unit 341. When the input signal is received, the driving signal control unit 341 instructs a driving signal generation unit 331 to generate a driving signal so as to transmit the ultrasonic wave at a predetermined frequency. The driving signal generation unit 331 generates and outputs a signal having a frequency set in advance. FIG. 4A illustrates a waveform of the driving signal generated by the driving signal generation unit 331. According to the present exemplary embodiment, five pulses of a pulse wave at 40 [kHz] are continuously output in a single measurement. Subsequently, the output of the pulse wave is stopped for a predetermined time period, and after the acoustic wave attenuates, the pulse wave is output again to perform the next measurement. Accordingly, an influence of disturbance of a reflected wave or the like by the recording material P or a surrounding member is reduced, and only a direct wave emitted from the transmission unit 31 can be received by the reception unit 32. The above-described signal is referred to as a burst wave.

Figure 3A:
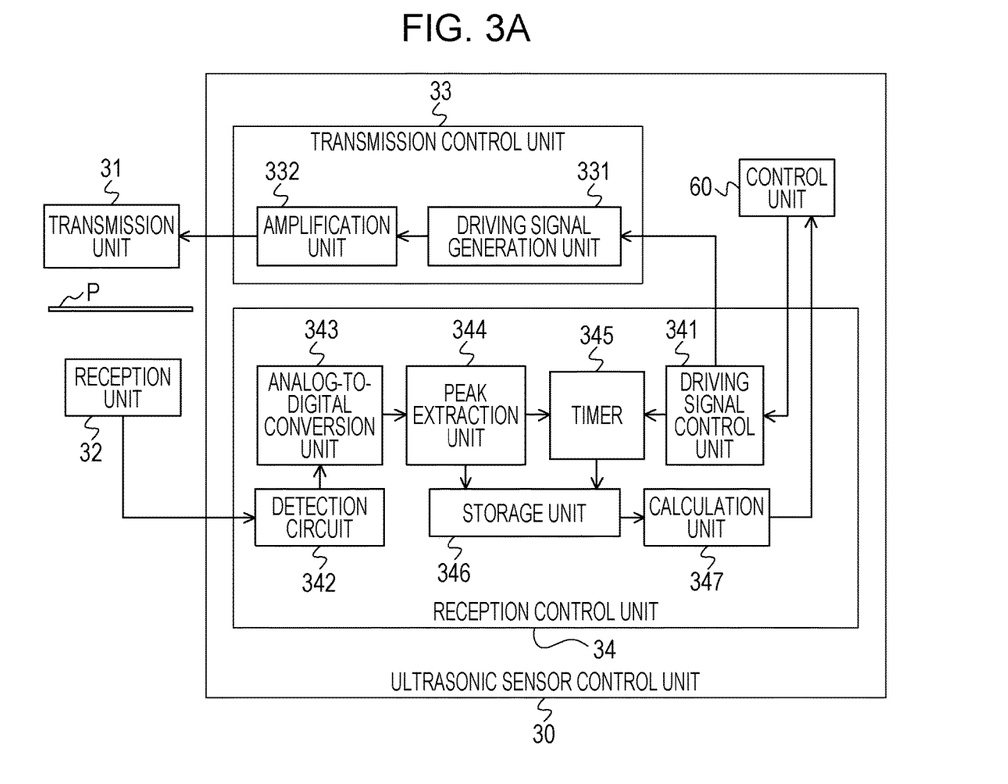
FIGS. 3A and 3B are block diagrams illustrating a configuration of a control unit of the ultrasonic sensor according to the exemplary embodiment of the present invention.
Figure 3B:
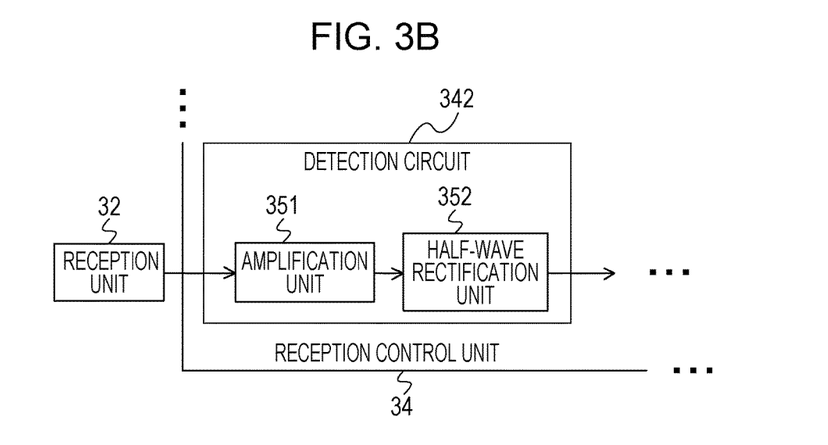
Figure 4B:
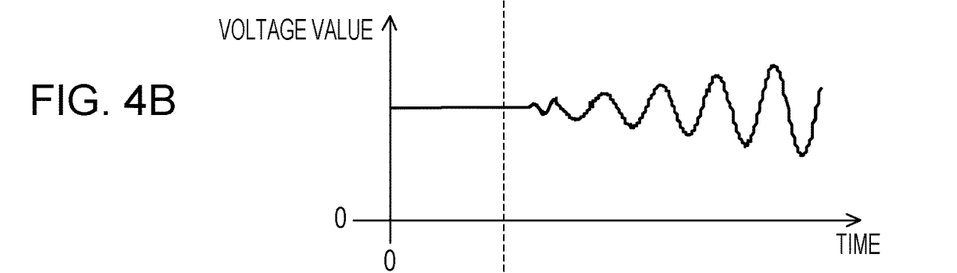
Figure 4C:
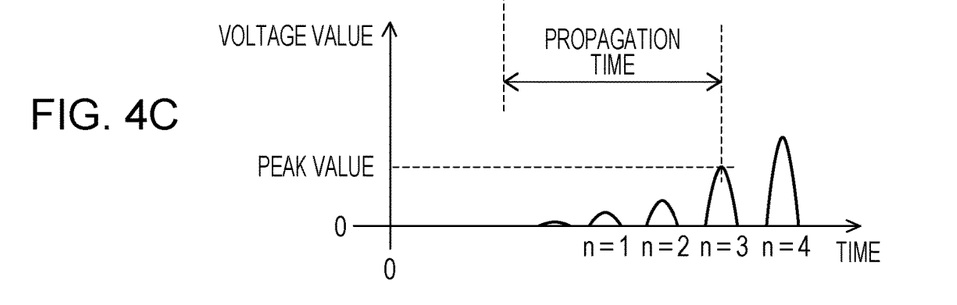

In FIG. 3A, an amplification unit 332 amplifies a level of the signal (voltage value) to be output to the transmission unit 31. The transmission unit 31 transmits the ultrasonic wave in accordance with the driving signal amplified by the amplification unit 332. The reception unit 32 receives the ultrasonic wave transmitted from the transmission unit 31 or the ultrasonic wave that has attenuated via the recording material P and outputs the reception signal to a detection circuit 342 of the reception control unit 34. As illustrated in FIG. 3B, the detection circuit 342 includes an amplification unit 351 and a half-wave rectification unit 352. According to the present exemplary embodiment, the amplification unit 351 can change amplification factors of the reception signal between a state in which the recording material P does not exist between the transmission unit 31 and the reception unit 32 and a state in which the recording material P exists therebetween. The half-wave rectification unit 352 performs half-wave rectification on the signal amplified by the amplification unit 351. However, each configuration is not limited to this. FIG. 4B illustrates a waveform of the reception signal in the reception unit 32, and FIG. 4C illustrates a waveform of the signal after the half-wave rectification.

The signal generated by the detection circuit 342 is converted from an analog signal to a digital signal by an analog-to-digital conversion unit 343. A peak extraction unit 344 illustrated in FIG. 3A extracts a peak value (local maximal value) of the signal on the basis of the converted digital signal. Herein, as described in FIG. 4C, first two peak values (n=1, 2) are low, and stable values may not be obtained in some cases because of an influence of the presence/absence of the recording material P, the type of the recording material P, or the like. Accordingly, to determine the basis weight of the recording material P, relatively high peak values at n=3 or higher are to be extracted. When a long period of time elapses since the ultrasonic wave is transmitted, the influence of disturbance of the reflected wave or the like is received. Thus, the peak value is preferably extracted as soon as possible within the range where the necessary value can be obtained. Therefore, according to the present exemplary embodiment, the peak value at n=3 is used.

A timer 345 illustrated in FIG. 3A starts counting at a time when the driving signal control unit 341 instructs the generation of the driving signal, and measures a propagation time until the peak extraction unit 344 extracts the peak value. Subsequently, both the value extracted by the peak extraction unit 344 and the propagation time measured by the timer 345 are saved in a storage unit 346. The above-described operation is referred to as a peak extraction operation. The above-described peak extraction operation is executed in both a state in which the recording material P does not exist between the transmission unit 31 and the reception unit 32 (when paper is absent) and a state in which the recording material P exists (when paper is present) therebetween. A calculation unit 347 calculates a calculation coefficient τ from a ratio of the peak value $V_0$ in a state in which the recording material P does not exist to the peak value V in a state in which the recording material P exists. In more details, the calculation coefficient τ can be obtained from the following expression.

$$\tau = V/V_0 \quad \text{Expression (1)}$$

The calculation coefficient τ is a value equivalent to the basis weight, and the control unit 60 determines the basis weight of the recording material P on the basis of the calculation coefficient τ calculated by the calculation unit 347. The CPU 80 controls the image formation condition of the image forming apparatus 1 on the basis of the determination result of the basis weight. As an alternative configuration to the above, the CPU 80 may control the image formation condition of the image forming apparatus 1 directly from the value of the calculation coefficient τ without determining the basis weight of the recording material P by the control unit 60.

Figure 5A:
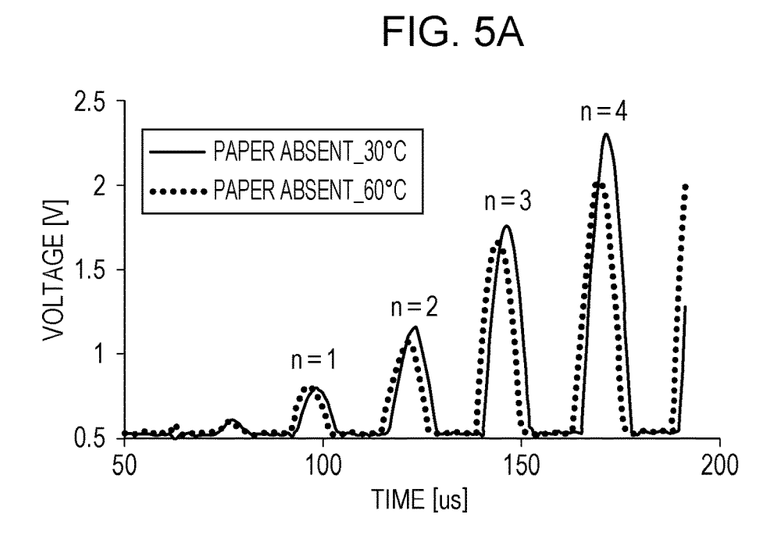
FIGS. 5A and 5B illustrate examples of a paper absent measurement output waveform by the ultrasonic sensor according to the exemplary embodiment of the present invention.

Next, the influence caused by the temperature around the ultrasonic sensor 35 will be described with reference to FIGS. 5A and 5B. FIG. 5A illustrates an output value of the ultrasonic wave received by the reception unit 32 when the paper is absent. The solid line corresponds to the output value of the ultrasonic wave when the surrounding temperature is 30 [° C.], and the dotted line corresponds to the output value of the ultrasonic wave when the surrounding temperature is 60 [° C.]. Each of the output values is measured under the same condition of the level of the driving signal of the transmission unit 31 or the like while the surrounding temperature is changed. According to FIG. 5A, the value of the extracted peak value is lower in a case where the surrounding temperature is 60[° C.] as compared with a case where the surrounding temperature is 30 [° C.]. The reason why the amplitude value of the ultrasonic wave is affected by the change in the surrounding temperature in this manner relates to a density of the air. For example, when the temperature around the ultrasonic sensor 35 rises, the air expands, and the density of the air becomes low, so that it is more difficult for the ultrasonic wave to be transmitted. On the other hand, when the temperature is decreased, the air contracts, and the density of the air becomes high, so that it is easier for the ultrasonic wave to be transmitted.

In addition, according to FIG. 5A, the peak value is extracted at an earlier timing in a case where the surrounding temperature is 60 [° C.] as compared with a case where the surrounding temperature is 30 [° C.]. That is, the propagation time is shortened. This is because an acoustic velocity v propagating through the air is represented by the following expression, and the acoustic velocity v is faster as the surrounding temperature is higher.

$$v = 331.5 + 0.607 \, k \, [\text{m/s}] \, (k: \text{centigrade temperature [° C.]}) \quad \text{Expression (2)}$$

Figure 5B:
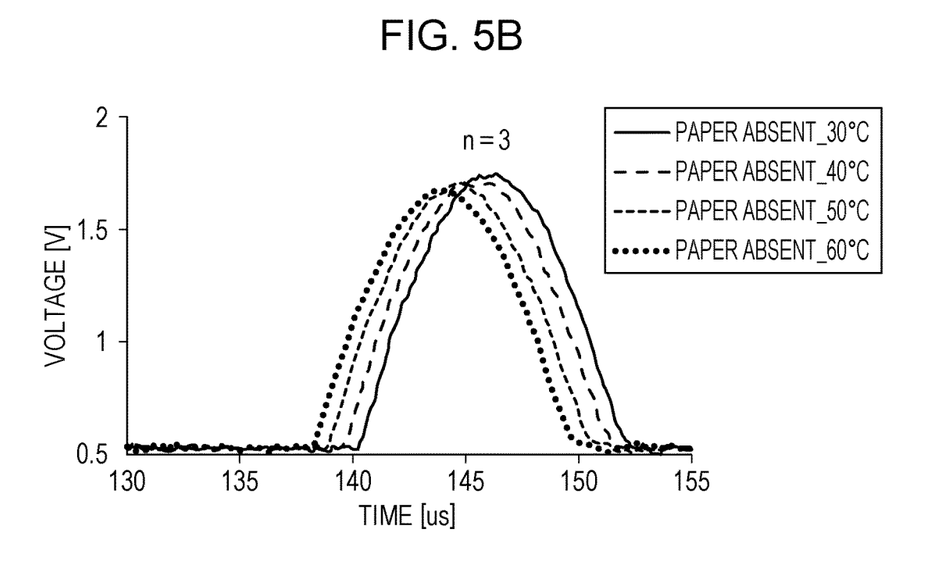

FIG. 5B is an expanded view of the waveform at n=3 of FIG. 5A. FIG. 5B further illustrates results while the surrounding temperature is changed from 30 [° C.] to 60 [° C.] by increments of 10° C. to be measured. The value of the peak value is lower and the propagation time is still shorter as the surrounding temperature is higher.

Figure 6A:
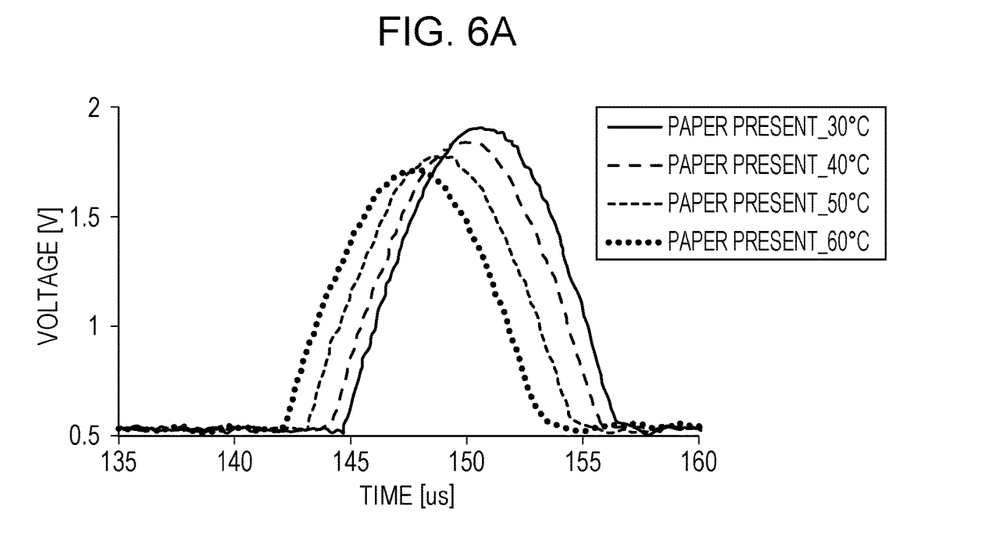
FIGS. 6A and 6B illustrate examples of a paper present measurement output waveform by the ultrasonic sensor according to the exemplary embodiment of the present invention.
Figure 6B:
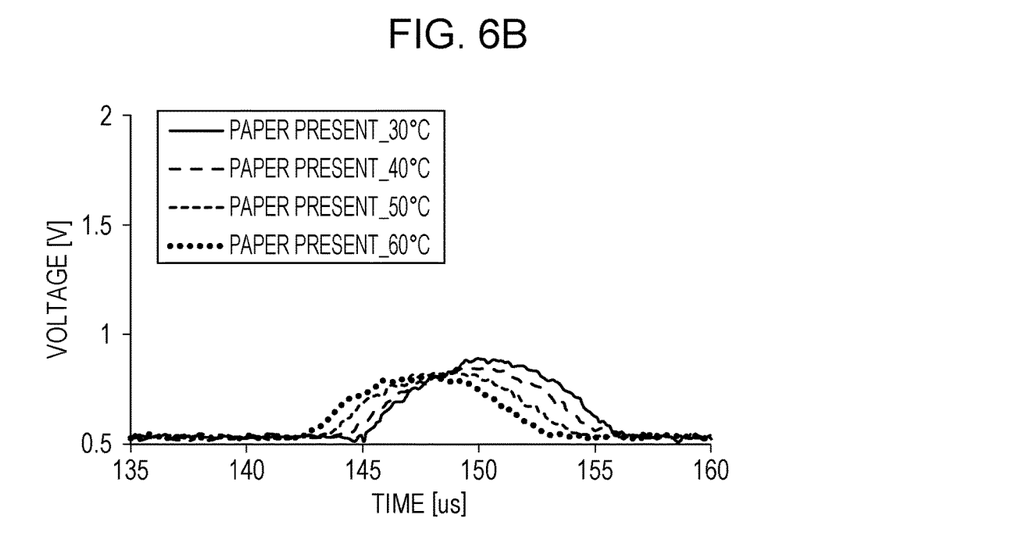

FIGS. 6A and 6B illustrate the output values of the ultrasonic waves when the paper is present, corresponding to the expanded views of the waveform at n=3 similarly to FIG. 5B. The basis weight of the used recording material P is 60 [g/m²] in FIG. 6A and is 200 [g/m²] in FIG. 6B. In addition, as described above, since the amplitude value of the ultrasonic wave attenuates by the influence of the recording material P, the amplification factor of the detection circuit 342 is changed such that the reception signal can be stably obtained when the paper is present. According to the present exemplary embodiment, the amplification factor when the paper is present is set as 18 folds with respect to that when the paper is absent. The reason why the amplitude value of the waveform of FIG. 6B is smaller than that of FIG. 6A is that the recording material P having the basis weight higher than that of the recording material P of FIG. 6A is detected in FIG. 6B. However, the temperature characteristics of the peak value and the propagation time have a tendency similar to that of the case when the paper is absent described with reference to FIG. 5B, regardless of any of the recording materials P is detected.

Figure 7A:
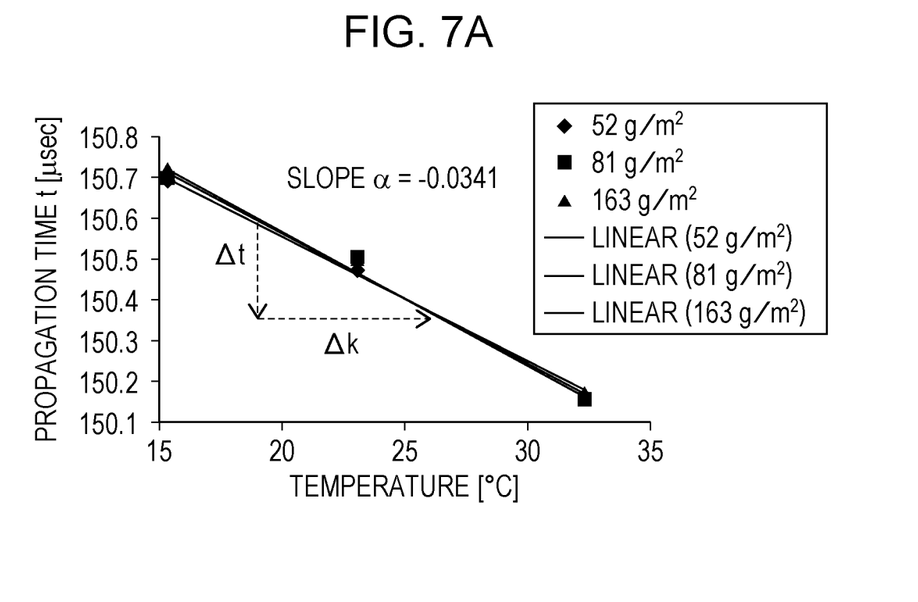
FIGS. 7A and 7B are temperature characteristic graphic representations of an output voltage and an ultrasonic propagation time of the ultrasonic sensor according to the exemplary embodiment of the present invention.
Figure 7B:
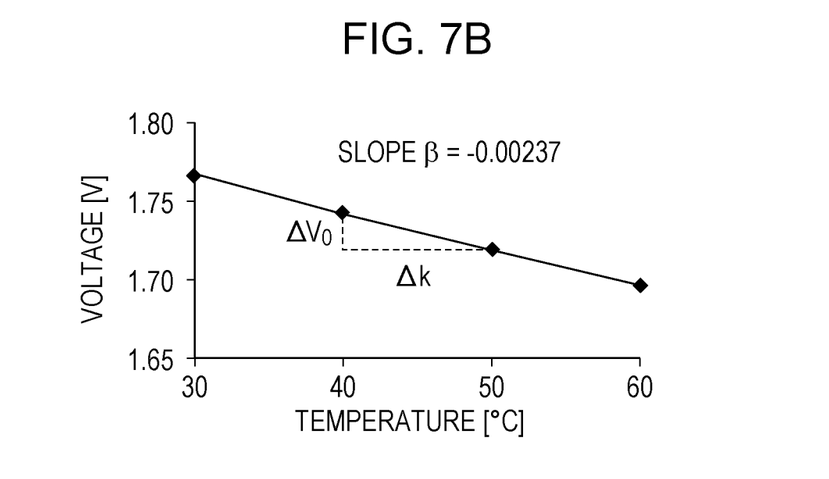

FIGS. 7A and 7B are graphic representations of the above-described temperature characteristics of the peak value and the propagation time. Three types including 52 [g/m²], 81 [g/m²], and 163 [g/m²] are used as the basis weights of the used recording materials P and correspond to recording paper generally respectively classified into thin paper, plain paper, and thick paper.

In FIG. 7A, the horizontal axis represents the temperature (temperature around the ultrasonic sensor 35), and the vertical axis represents the propagation time when the paper is present. FIG. 7A illustrates that the temperature and the propagation time have a linear relationship. A notable point is that slopes with respect to the changes in the propagation time and the temperature are substantially the same from the thin paper to the thick paper. Therefore, irrespective of the basis weight of the detected recording material P, a change amount $\Delta k$ [° C.] of the temperature around the ultrasonic sensor 35 can be obtained from the following expression on the basis of this slope $\alpha$ and a change amount $\Delta t$ [sec] of the propagation time.

$$\Delta k = \Delta t / \alpha \qquad \text{Expression (3)}$$

Since the value of this slope $\alpha$ is changed while being affected by a space between the transmission unit 31 and the reception unit 32 of the ultrasonic sensor 35, the configuration of the holding member, or the like, the value may be determined in accordance with the configuration of the used ultrasonic sensor 35. It has been described that the value of the slope $\alpha$ is substantially the same irrespective of the basis weight (type) of the recording material P, but as may be understood from FIG. 7A, a slight variation exists. However, the influence caused by this variation on $\Delta k$ calculated by Expression (3) is minute and is at a negligible level with respect to a determination accuracy of the basis weight. Specific numeric values will be described below.

In FIG. 7B, the horizontal axis represents the temperature, and the vertical axis represents the peak value when the paper is absent. FIG. 7B illustrates that the temperature and the peak value when the paper is absent have a linear relationship. When a slope of this straight line is set as $\beta$, a change amount $\Delta V_0$ [V] of the peak value when the paper is absent can be obtained by the following expression on the basis of $\Delta k$ obtained by Expression (3).

$$\Delta V_0 = \beta \Delta k \qquad \text{Expression (4)}$$

The value of $\beta$ may also be determined in accordance with the configuration of the used ultrasonic sensor 35. According to the present exemplary embodiment, the ultrasonic sensor 35 having the configuration described with reference to FIG. 2 is used, and as illustrated in FIGS. 7A and 7B, $\alpha$ is −0.0341 and $\beta$ is −0.00237.

By using the relationship described so far, a specific example will be described in which the peak value when the paper is absent is actually corrected, and the calculation coefficient $\tau$ of the recording material P during the continuous printing is calculated. As preconditions, the basis weight of the recording material P is set as 60 [g/m²], the paper absent peak value $V_0$ at the time of the start of the image formation is set as 1.77 [V], and the propagation time $t_1$ corresponding to the measurement result of the first recording material P1 is set as 150.50 [µsec]. The paper present peak value $V_n$ and the propagation time $t_n$ corresponding to the measurement result of the n-th recording material Pn are respectively set as $V_n$=1.75 [V] and $t_n$=149.87 [µsec].

Figure 8:
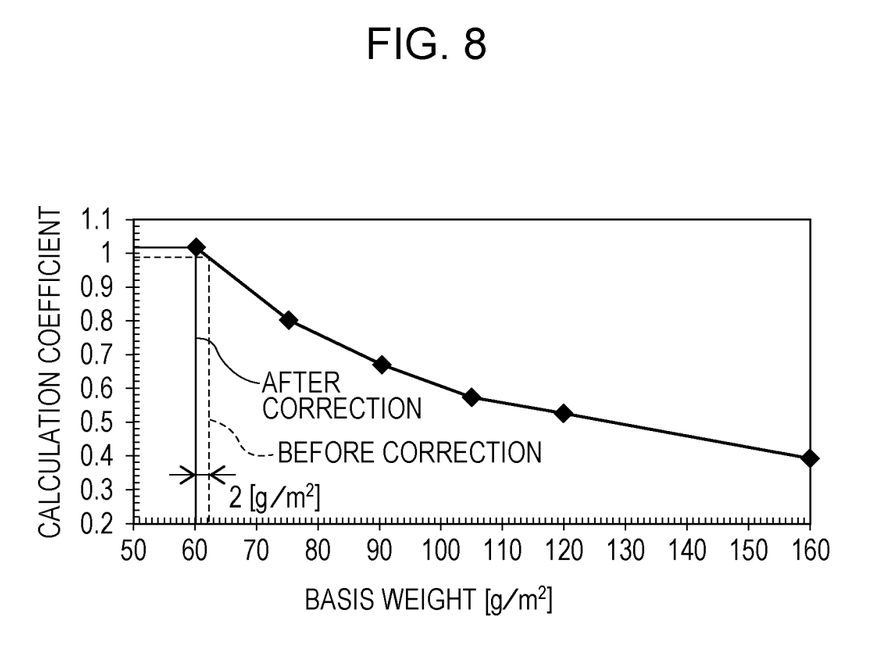
FIG. 8 illustrates a relationship between a basis weight and a calculation coefficient according to the exemplary embodiment of the present invention.

First, the temperature change amount $\Delta k$ from the time of the measurement of the first sheet until the time of the measurement of the n-th sheet (n is a predetermined number) is obtained. Since the change amount $\Delta t$ of the propagation time is $t_n - t_1$ = −0.63 [µsec], $\Delta k$=18.5 [° C.] is established from Expression (3). Next, since $\Delta V_0$=−0.044 [V] is established from Expression (4), the paper absent peak value $V_{0n}$ after the correction becomes $V_{0n} = V_0 + \Delta V_0$ = 1.73 [V]. Thus, $\tau_n \approx 1.01$ is obtained as the calculation coefficient after the correction from Expression (1). If the calculation coefficient is calculated from Expression (1) without correcting the paper absent peak value, $\tau_n \approx 0.99$ is established on the basis of $V_0$ and $V_n$, and an error of approximately 2 [%] is generated as compared with the case where the correction is performed. A degree of this influence will be described with reference to the graphic representation between the basis weight and the calculation coefficient illustrated in FIG. 8. As illustrated in FIG. 8, since a difference of approximately 2 [g/m²] exists as the basis weight before the correction and after the correction, the basis weight is determined to be higher than the actual basis weight in a case where the correction is not performed. As a result, an erroneous image formation condition may be set by the CPU 80, and the quality of the image formed on the recording material P may be degraded in some cases.

Here, the influence on the determination accuracy of the basis weight which is caused by the fluctuation of $\alpha$ described above will be described. According to the present exemplary embodiment, a result of experiment by the inventor suggests that a variation of $\alpha$ caused by the type of the recording material P from the thin paper (52 [g/m²]) to the thick paper (163 [g/m²]) is approximately ±0.001. When this result is applied to the above-described example, $\Delta k$ has a variation of ±0.5 [° C.] from Expression (3). Therefore, $\Delta k$ varies in a range between 18.0 [° C.] and 19.0 [° C.]. Next, a variation of the calculation coefficient $\tau_n$ is calculated from Expression (4) and Expression (1), it may be understood with reference to FIG. 8 that the variation is approximately ±0.0006, and the influence on the determination accuracy of the basis weight is sufficiently small. Thus, even in a case where the characteristic of the propagation time has the variation because of the type of the recording material P or the like, it may be understood that it is possible to obtain the sufficient determination accuracy of the basis weight.

Next, a method of controlling the image formation condition with respect to the recording material P in the middle of the continuous printing will be described with reference to a flowchart of FIG. 9. The sensor control unit 30, the CPU 80, or the like executes control based on the flowchart of FIG. 9 on the basis of a program stored in a ROM or the like that is not illustrated in the drawing.

When the image forming apparatus 1 starts the image formation, the sensor control unit 30 starts the detection of the ultrasonic wave at the same time. After the start of detecting the ultrasonic wave, the sensor control unit 30 performs the paper absent measurement to obtain the data of the paper absent peak value $V_0$ (S101). Next, the sensor control unit 30 performs the paper present measurement of the conveyed first recording material $P_1$ to obtain the data of the paper present peak value $V_1$ and the propagation time $t_1$ (S102). The sensor control unit 30 calculates the calculation coefficient $\tau_1$ of $P_1$ on the basis of the obtained $V_0$ and $V_1$ from Expression (1) (S103). The sensor control unit 30 determines the basis weight of the recording material $P_1$ on the basis of the calculation coefficient $\tau_1$ and the CPU 80 sets the image formation condition in accordance with the determined basis weight (S104).

In the detection of the second and subsequent sheets continuously executed, only the paper present measurement is performed without performing the paper absent measurement. The sensor control unit 30 performs the paper present measurement of the conveyed n-th (n≥2) recording material $P_n$ to obtain the data of the paper present peak value $V_n$ and the propagation time $t_n$ (S105). Herein, the sensor control unit 30 calculates the temperature change amount $\Delta k_n$ from the time of the measurement of $P_1$ by using Expression (3) on the basis of $t_1$ and $t_n$ (S106). Subsequently, the sensor control unit 30 calculates the paper absent peak value $V_{0n}$ at the time of the obtainment of the data of $P_n$ by using Expression (4) on the basis of $V_0$ and $\Delta k_n$ (S107). Subsequently, the sensor control unit 30 calculates the calculation coefficient $\tau_n$ of $P_n$ on the basis of $V_n$ and $V_{0n}$ (S108). The sensor control unit 30 determines the basis weight of the recording material $P_n$ on the basis of the calculation coefficient $\tau_n$, and the CPU 80 sets the image formation condition in accordance with the determined basis weight (S109). Herein, the CPU 80 determines whether or not the printing is ended (S110). In a case where the printing continues, S105 to S109 are repeated with respect to the second and subsequent sheets until the printing is ended.

As described above, the peak value of the received ultrasonic wave and the propagation time have a correlation with the temperature around the ultrasonic sensor 35, and it is possible to calculate the change amount of the paper absent peak value by using this relationship even when the continuous printing is being performed. Therefore, for example, even in a case where the temperature around the ultrasonic sensor 35 changes due to the internal temperature rise in the image forming apparatus 1 that does not perform the paper absent measurement because the sheet interval is short during the continuous printing, the change amount of the paper absent peak value can be calculated. Accordingly, since the sheet interval does not need to be expanded or the temperature sensor does not need to be added, it is possible to suppress the decrease in the productivity or the increase in the costs.

According to the above-described configuration, even in a case where the image is continuously formed on a plurality of recording materials, it is possible to provide the image forming apparatus that accurately controls the image formation condition and improves the image quality irrespective of the change in the surrounding temperature.

In particular, in a case where the image is continuously formed on both surfaces of a plurality of recording materials, the recording material warmed up by passing through the fixing unit once passes through the area in the vicinity of the sensor again, the increase in the surrounding temperature of the sensor becomes apparent. In the above-described case also, it is possible to provide the image forming apparatus that accurately controls the image formation condition and improves the image quality irrespective of the change in the surrounding temperature.

In addition, a method of performing the environmental correction at a sheet interval is considered as another method of performing the environmental correction in the middle of the continuous image formation on a plurality of recording materials. Herein, the sheet interval refers to a gap between the trailing edge of the preceding recording material conveyed and the leading edge of the following recording material conveyed. When a period corresponding to the sheet interval is used, it is possible to obtain the paper absent peak value even in the middle of the continuous printing. However, to improve a productivity (the number of sheets on which the image is formed per unit time) without changing the conveyance speed of the recording material, the sheet interval is to be shortened. In the image forming apparatus in which the sheet interval is thus shortened, the detection of the ultrasonic wave is not performed during the period corresponding to the sheet interval, and the environmental correction is not performed in the middle of the continuous image formation on the plurality of recording materials. According to the present exemplary embodiment, in the above-described case also, it is possible to provide the image forming apparatus that accurately controls the image formation condition and improves the image quality irrespective of the change in the surrounding temperature.

It should be noted that, according to the above-described exemplary embodiment, the environmental correction is performed while the paper absent peak value $V_0$ at the start of the image formation and the propagation time $t_1$ at the time of the measurement of the first recording material $P_1$ are used as the reference. However, the configuration is not limited to this. The data used as the reference can be desirably selected, and the temperature change amount and the change amount of the paper absent peak value from the time when the selected data is measured may be calculated to obtain the calculation coefficient.

Figure 10:
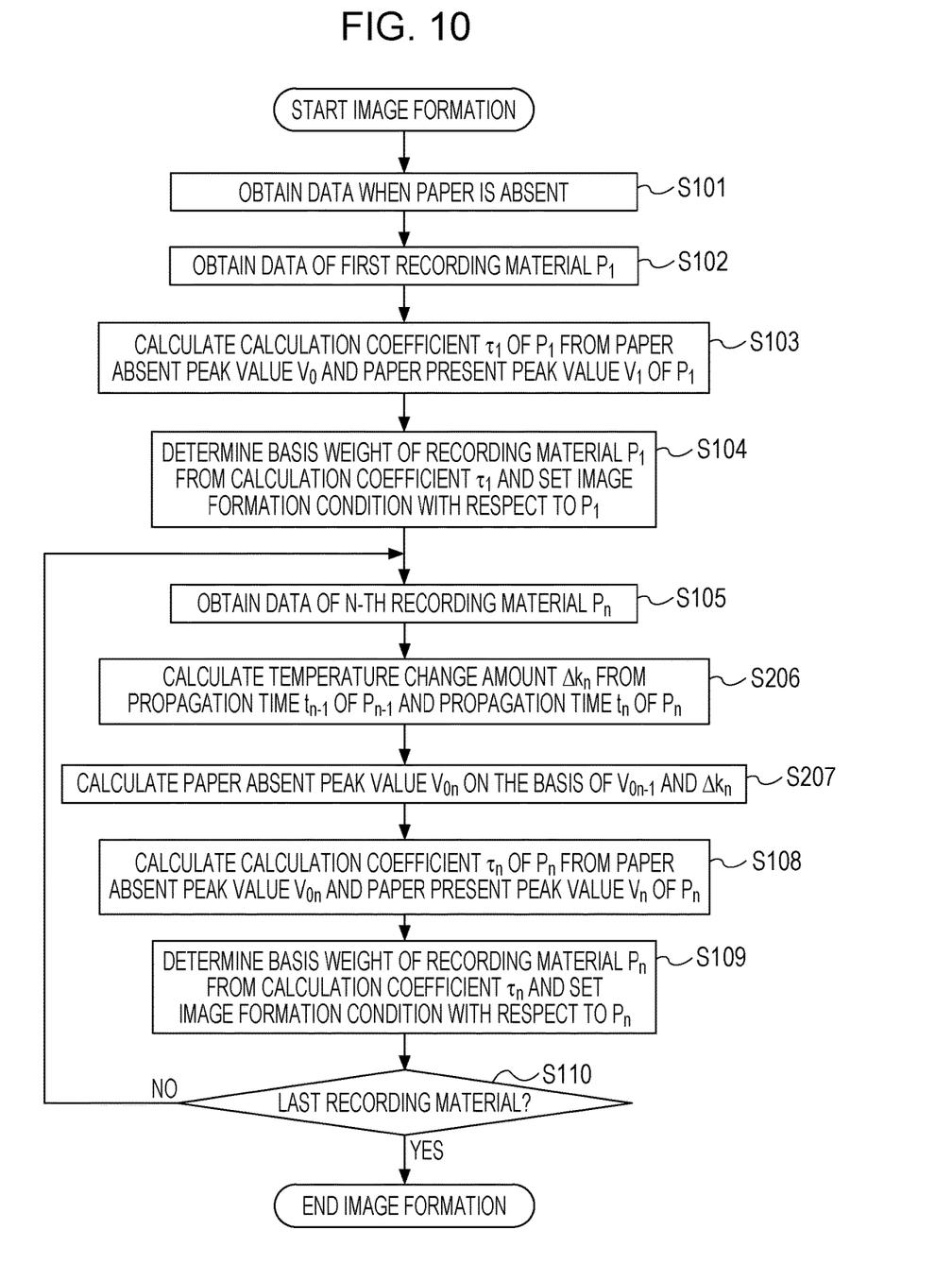
FIG. 10 is a flowchart for setting an image formation condition according to another exemplary embodiment of the present invention.

For example, a method of updating the propagation time and the paper absent peak value used as the references each time the recording material is measured and calculating the change amount from the time of the measurement of the preceding recording material may be employed. FIG. 10 illustrates a flowchart illustrating this control.

Control based on the flowchart of FIG. 10 is executed by the sensor control unit 30, the CPU 80, or the like on the basis of a program stored in a ROM which is not illustrated in the drawings. A step in which the same processing as that of FIG. 9 is performed will be assigned the same reference symbol, and descriptions thereof will be omitted.

Figure 9:
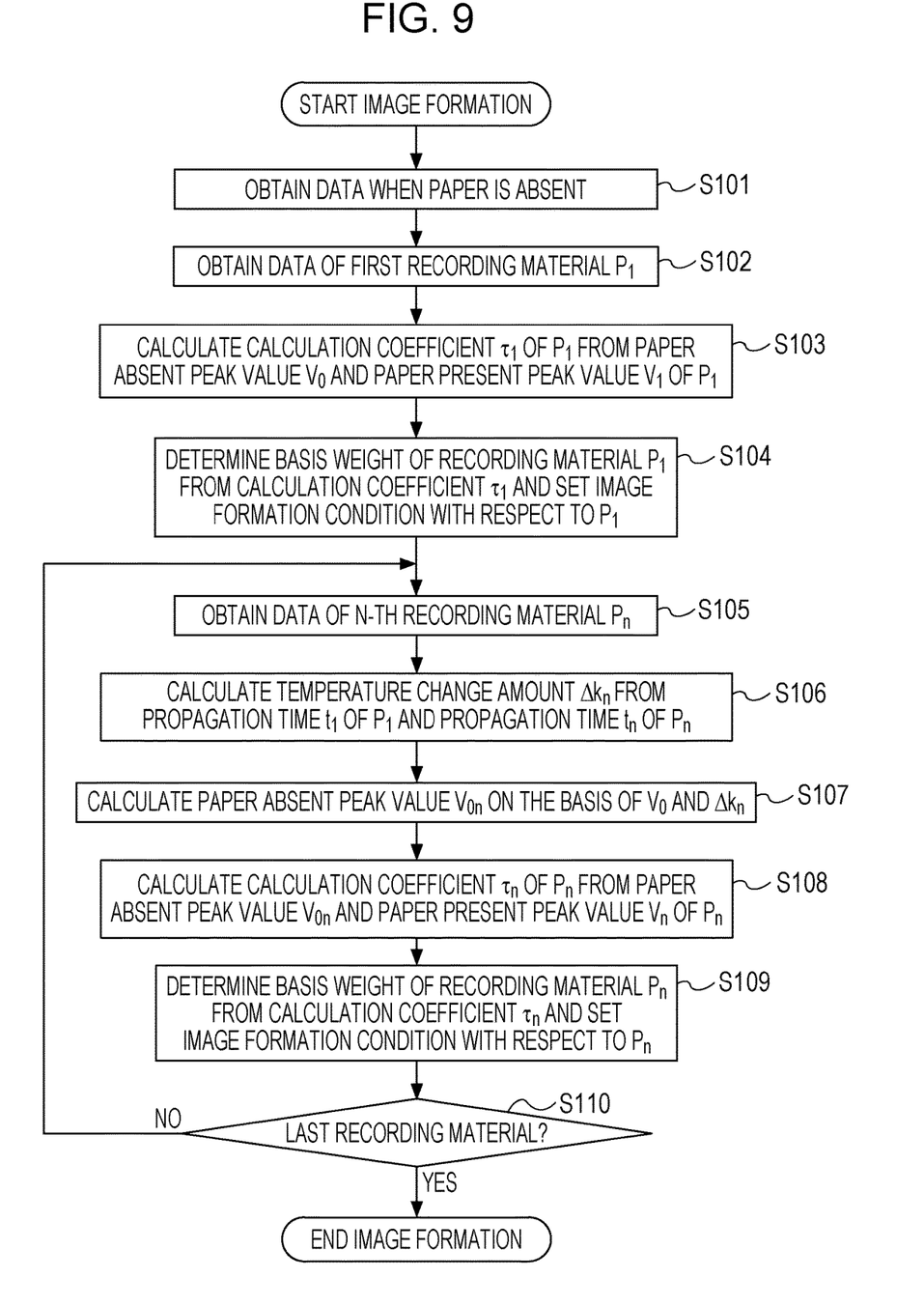
FIG. 9 is a flowchart for setting an image formation condition according to the exemplary embodiment of the present invention.

Differences of the flowchart of FIG. 10 from FIG. 9 are S206 and S207. The sensor control unit 30 calculates the temperature change amount $\Delta k_n$ from the time of the measurement of $P_{n-1}$ by using Expression (3) on the basis of $t_{n-1}$ and $t_n$ corresponding to the data of the (n−1)-th recording material $P_{n-1}$ (S206). Subsequently, the sensor control unit 30 calculates the paper absent peak value $V_{0n}$ at the time of the data obtainment of $P_n$ by using Expression (4) on the basis of the paper absent peak value $V_{0n-1}$ and $\Delta k_n$ after the correction of $P_{n-1}$ (S207). In this manner, in the flowchart of FIG. 10, the propagation time and the paper absent peak value used as the references are updated each time the recording material is measured.

It should be noted that, according to the present exemplary embodiment, the method has been described in which the paper absent peak value is corrected on the basis of the calculated temperature change amount, and the basis weight of the recording material is determined to set the image formation condition. However, embodiments are not limited to this method. For example, a reference for determining the basis weight or a reference for setting the image formation condition may be changed on the basis of the calculated temperature change amount. More specifically, the threshold to be compared with the calculation coefficient τ when the basis weight is obtained, and the constant in the calculation expression for converting the calculation coefficient τ into the basis weight may be changed. The same applies to the setting of the image formation condition.

According to the above-described exemplary embodiment, a case where the image is continuously formed on the plurality of recording materials refers to the following state. For example, this refers to a case where a finishing operation (post-rotation operation) of members related to the image formation such as the fixing unit 21 is not performed in a period since an image is formed on a first recording material until an image is formed on a second recording material.

In addition, according to the above-described exemplary embodiment, the method of setting the image formation condition with regard to the continuous recording materials including the first recording material and the second and subsequent recording materials has been described. However, embodiments are not limited to the method. For example, the recording material set as the target may be a single recording material. The exemplary embodiment of the present invention is applied to duplex printing on the single recording material, and with respect to the conditions when the image is formed on a first surface, the conditions when the image is formed on a second surface may be changed.

In addition, according to the above-described exemplary embodiment, the configuration is adopted in which the ultrasonic sensor 35 is provided while being fixed to the image forming apparatus 1, but the ultrasonic sensor 35 may have a configuration of being detachably attached to the image forming apparatus 1. When the ultrasonic sensor 35 has the detachable configuration, for example, a user can easily replace the ultrasonic sensor 35 in case of malfunction.

In addition, according to the above-described exemplary embodiment, a configuration may be adopted in which the ultrasonic sensor 35 is integrated with a control unit such as the sensor control unit 30 or the CPU 80 to be detachably attached to the image forming apparatus 1. In this manner, when the ultrasonic sensor 35 and the control unit are integrated with each other to be replaceable, in a case where the function of the ultrasonic sensor 35 is updated or added, the user can easily replace the sensor with a sensor having a new function.

In addition, according to the above-described exemplary embodiment, the example of the laser beam printer has been illustrated, but the image forming apparatus to which the exemplary embodiment of the present invention is applied is not limited to this. A printer or copier based on another printing system such as an ink-jet printer may be used.

In addition, according to the above-described exemplary embodiment, as described in FIG. 7A, the control is performed while attention is paid to the point that the change amounts (slopes of the straight lines) of the propagation times with respect to the temperature are substantially the same irrespective the type (basis weight) of the recording material. However, embodiments are not limited to this. According to FIG. 7A, the slopes of the grapes of the thin paper, the plain paper, and the thick paper are the same, and also intercepts are also the same. That is, the three grapes are substantially overlapped with one another. This indicates that the relationships between the temperature and the propagation time are substantially the same irrespective of the type of the recording material.

Therefore, the temperature change amount may be calculated by comparing the propagation times of the ultrasonic waves received via the recording materials of different types with one another. For example, in the flowchart of FIG. 9, even in a case where the type of the first recording material $P_1$ is the thick paper and the type of the n-th recording material $P_n$ is the thin paper, the temperature change amount $\Delta k_n$ may be calculated on the basis of the propagation time $t_1$ and the propagation time $t_n$.

In addition, the detection operation does not necessarily need to be performed twice. The control may be performed in a manner that the detection operation is previously performed once in a state in which the reference temperature and the paper absent peak value $V_0$ at the reference temperature are stored in the storage unit, and the type of the recording material is determined.

For example, in FIG. 7A, regardless of the type of the recording material, that is regardless of the thin paper, the plain paper, or the thick paper, in a case where the propagation time is 150.4 [μsec], the temperature around the sensor is approximately 25° C. In this manner, since the propagation time and the surrounding temperature have a one-to-one relationship, when the propagation time is detected, the surrounding temperature can be calculated. As a result, the temperature change amount with respect to the reference temperature can also be calculated, and it is possible to correct the paper absent peak value. Therefore, the type of the predetermined recording material can be determined on the basis of the propagation time and the amplitude value of the ultrasonic wave via the predetermined recording material, and the image formation condition can be controlled. In addition, the above-described various parameters can be calculated on the basis of a table stored in the storage unit, or the control unit may calculate the various parameters on the basis of a calculation expression stored in the storage unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image forming apparatus comprising:
    an image forming unit configured to form an image on a recording material;
    a transmission unit configured to transmit an ultrasonic wave;
    a reception unit configured to receive the ultrasonic wave transmitted from the transmission unit; and
    a control unit configured to obtain a surrounding temperature on the basis of a time period from when the transmission unit transmits the ultrasonic wave toward a predetermined recording material until when the reception unit receives the ultrasonic wave via the predetermined recording material and control, on the basis of an amplitude value of the ultrasonic wave received via the predetermined recording material and the surrounding temperature, an image formation condition in a case where the image forming unit forms the image on the predetermined recording material.

2. The image forming apparatus according to claim 1, wherein the control unit obtains an amplitude value of an ultrasonic wave received by the reception unit without the recording material existing between the transmission unit and the reception unit, and wherein the control unit corrects the amplitude value of the ultrasonic wave without the recording material existing between the transmission unit and the reception unit on the basis of the surrounding temperature, and controls the image formation condition in a case where the image is formed on the predetermined recording material on the basis of a ratio of the amplitude value of the ultrasonic wave via the predetermined recording material and the corrected amplitude value of the ultrasonic wave.

3. The image forming apparatus according to claim 1, wherein the image formation condition is a temperature when a fixing unit included in the image forming unit fixes the image on the recording material, a voltage value supplied to a transfer unit in the image forming unit, or a conveyance speed of the recording material.

4. The image forming apparatus according to claim 1,
wherein the transmission unit and the reception unit are arranged so as to face each other, and
wherein the reception unit receives the ultrasonic wave transmitted by the transmission unit and transmitted through the recording material.

5. An ultrasonic sensor comprising:
a transmission unit configured to transmit an ultrasonic wave;
a reception unit configured to receive the ultrasonic wave transmitted from the transmission unit; and
a control unit configured to obtain a surrounding temperature on the basis of a time period from when the transmission unit transmits the ultrasonic wave toward a predetermined recording material until when the reception unit receives the ultrasonic wave via the predetermined recording material and determine, on the basis of an amplitude value of the ultrasonic wave received via the predetermined recording material and the surrounding temperature, a type of the predetermined recording material.

6. The ultrasonic sensor according to claim 5,
wherein the transmission unit and the reception unit are arranged so as to face each other, and
wherein the reception unit receives the ultrasonic wave transmitted by the transmission unit and transmitted through the recording material.

7. The ultrasonic sensor according to claim 6,
wherein the control unit determines a basis weight of the predetermined recording material on the basis of the amplitude value of the ultrasonic wave via the predetermined recording material and the surrounding temperature.

* * * * *